Jan. 30, 1934.  A. F. POOLE  1,945,069
CLOCK
Filed March 21, 1930  3 Sheets-Sheet 1
Fig. 1
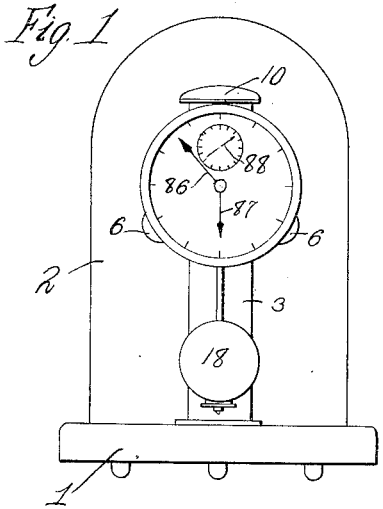
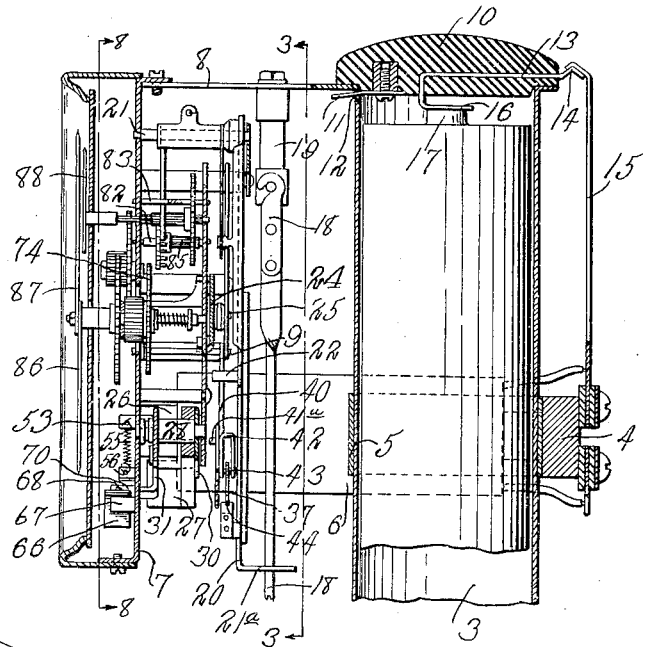
Fig. 2
Fig. 3
Fig. 4
INVENTOR
Arthur F. Poole
By Max W. Parmer
ATTORNEYS Jan. 30, 1934.  A. F. POOLE  1,945,069
CLOCK
Filed March 21, 1930  3 Sheets-Sheet 2
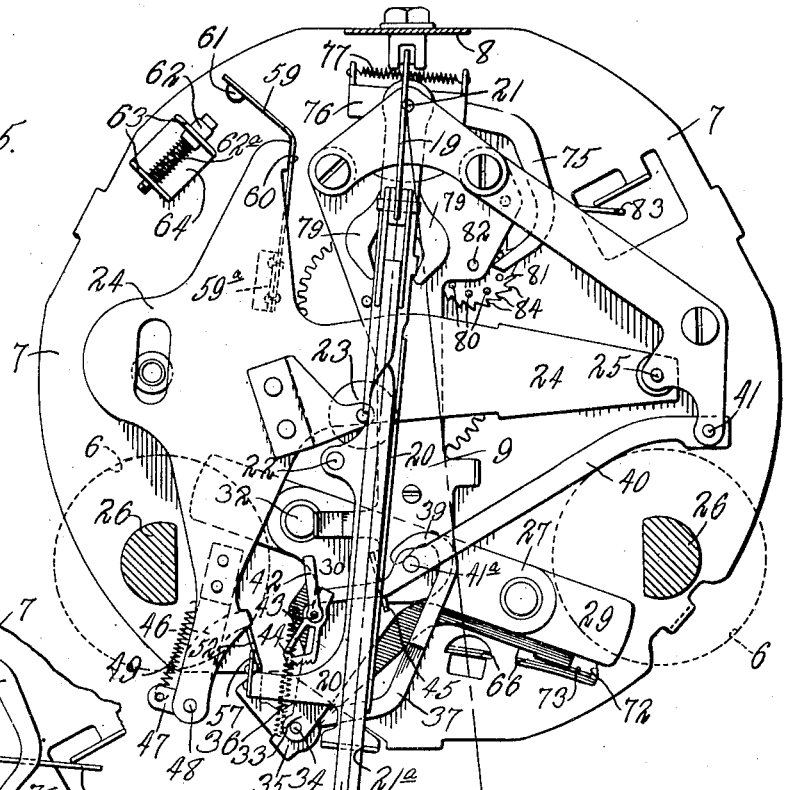
INVENTOR.
Arthur F. Poole
by Max D. Farmer
ATTORNEYS.

Jan. 30, 1934.　　　A. F. POOLE　　　1,945,069
CLOCK
Filed March 21, 1930　　　3 Sheets-Sheet 3
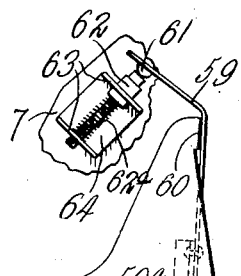
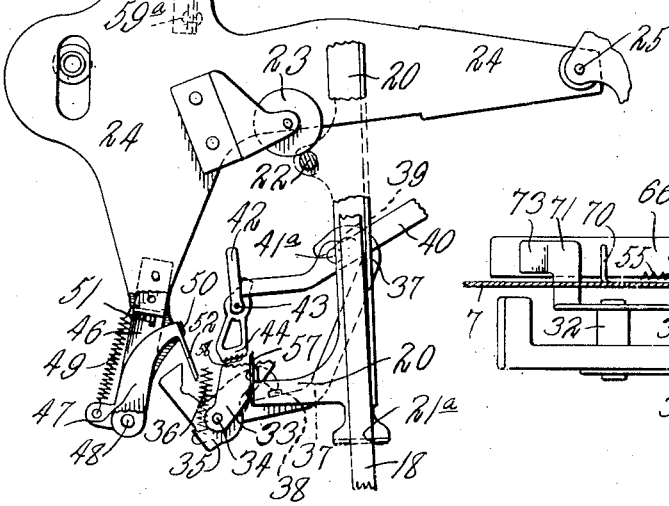
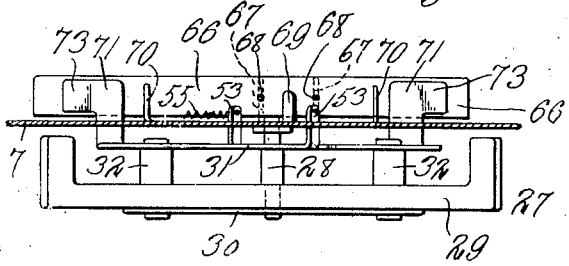
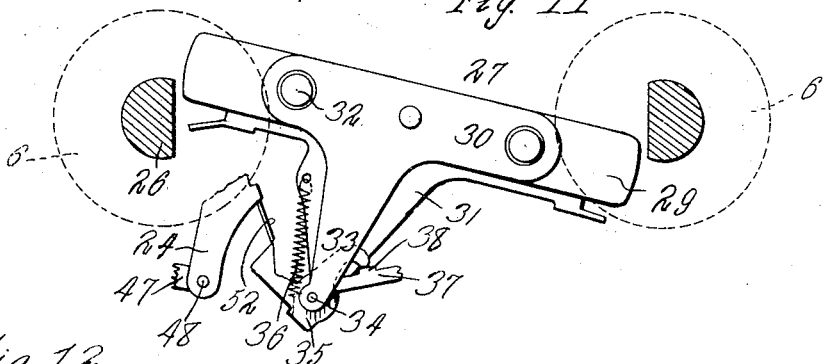
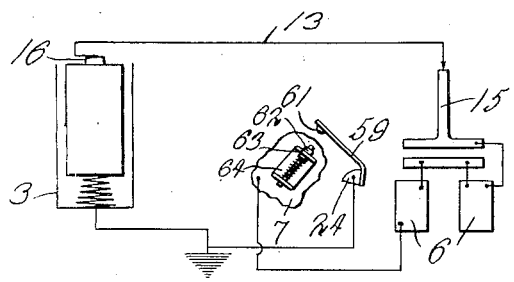
INVENTOR
Arthur F. Poole
by Max D. Farmer
ATTORNEYS Patented Jan. 30, 1934

1,945,069

UNITED STATES PATENT OFFICE 1,945,069

CLOCK

Arthur F. Poole, Ithaca, N. Y., assignor to Poole Manufacturing Co., Inc., Ithaca, N. Y., a corporation of New York Application March 21, 1930. Serial No. 437,735

19 Claims. (Cl. 58—30)

This invention relates to clocks, and particularly to the type in which an oscillating element having a natural period of oscillation is maintained in oscillation by impulses delivered thereto at intervals. The invention also is in the nature of an improvement upon the electrical clocks disclosed in my co-pending applications, Ser. No. 685,387 filed Jan. 10, 1924, now Pat. No. 1,756,472, granted April 29, 1930, and Ser. No. 159,323 filed Jan. 6, 1927, now Pat. 1,756,437, granted Apr. 29, 1930.

An object of the invention is generally to improve and simplify the mechanism of such clocks, and render it quiet and dependable in operation.

A further object of the invention is to provide an improved clock construction, with which noise of operation will be reduced to a minimum; with which various adjustments may be made in a simple manner; which will be relatively simple, compact, durable and inexpensive in construction; which will require a minimum of energy to operate; with which the number of parts required will be a minimum; and with which the operations during assembly may be simplified.

Another object of the invention is to provide an improved clock mechanism of the type in which an oscillating time measuring element is maintained in oscillation by impulses delivered thereto at intervals; with which the impulses will be delivered automatically at each oscillation of said element so long as the amplitude of oscillation of said element is below a selected minimum; and with which the impulses delivered will continue for each oscillation of said element throughout a considerable range of its amplitude of oscillation below said selected minimum.

A further object of the invention is to provide an improved clock of this type which is capable of driving mechanism offering a varying resistance, without danger of stopping and without affecting its accuracy as a time keeper.

Various other objects and advantages will be apparent from the following description of an embodiment of the invention, and the novel features will be particularly pointed out hereinafter in connection with the appended claims.

In the accompanying drawings:

Fig. 1 is an elevation, on a reduced scale, of a clock constructed in accordance with this invention;

Fig. 2 is a sectional side elevation of the upper portion of the same, the section being taken approximately along the line 2—2 of Fig. 3;

Fig. 3 is a sectional elevation of a portion of the same, with the section taken approximately along the line 3—3 of Fig. 2;

Fig. 4 is an elevation of the lower end of the impulse lever to illustrate the resiliently mounted strike member;

Fig. 5 is an elevation similar to Fig. 3, and illustrating the pendulum in a different positon in its swing;

Fig. 6 is a sectional elevation of a portion of the mechanism by which the pendulum operates the escapement wheel;

Fig. 7 is an elevation of a part of the mechanism, and illustrating the delivery of an impulse to the pendulum by the impulse lever;

Fig. 8 is a sectional elevation of the clock, with the section taken approximately along the line 8—8 of Fig. 2;

Fig. 9 is an elevation somewhat similar to Fig. 7, but illustrating the relation of the parts at the completion of a driving impulse upon the pendulum;

Fig. 10 is a sectional plan of a portion of the clock, with the section taken approximately along the line 10—10 of Fig. 8;

Fig. 11 is a sectional elevation of the armature and electromagnets while the impulse lever is held in poised position; and Fig. 12 is a diagram of the electric circuit of the clock.

In the illustrated embodiment of the invention, the clock mechanism is mounted upon a suitable base 1 (Fig. 1) and enclosed within a glass dome 2. A tubular pedestal or post 3 rises from the base and contains dry batteries for supplying energy to operate the clock mechanism. A bar 4 (Fig. 2) of soft iron is disposed across the rear of the pedestal 3 and secured to the pedestal by a strap 5. A pair of electromagnets 6 are secured to the ends of the bar 4 and extend forwardly along opposite sides of the pedestal 3.

The clock frame having a plate 7 is disposed in front of the electromagnets and attached to the forward ends of the cores thereof, and also by a bar 8 to the upper end of the pedestal 3. Another plate 9 of the frame is secured to the rear side of, and spaced from, the frame plate 7 for mounting some of the clock mechanism. The upper end of the pedestal 3 (Fig. 2) is closed by cover 10 having a tongue 11 which engages in an aperture 12 in the upper end of the pedestal shell. The cover 10 is of insulating material and carries a conductor or contact 13 of spring metal which extends outwardly from the peripheral edge at a point opposite the tongue 11, and terminates in a hump 14 which has a releasable, latched engagement with a spring metal arm 15 mounted through suitable insulation upon the cross bar 4.

The conductor 13 at its inner end depends from the underface of the cover and serves as a spring contact terminal 16 which bears upon the central electrode 17 of the uppermost battery contained in the pedestal. The outer electrode of the lowermost battery within the pedestal is grounded in the usual manner to the shell of the pedestal. A pendulum 18 is suspended from the frame bar 8 in any suitable manner, such as by a leaf spring 19. A pendulum crutch 20 is pivoted at its upper end upon a pivot 21, Fig. 5, in close proximity to the spring 19 and has an angular slotted lower end 21a which embraces the pendulum 18 to insure oscillation together of the pendulum and crutch.

The pendulum crutch is provided with an impulse pin 22 through which it receives impulses from an impulse roller 23 rotatably mounted upon an impulse lever or gravity arm 24, which is pivotally mounted at one end by a pin 25. When the impulse lever or arm 24 is released its free end falls, and the impulse roller 23 by engagement with the impulse pin 22 imparts a driving impulse to the crutch and pendulum tending to maintain them in oscillation.

The polar ends 26 (Figs. 5 and 11) of the electromagnets 6 receive between them an armature 27 which is pivoted between its ends upon a stud 28 (Figs. 2 and 8), so as to oscillate between an attracted position in which it extends between the polar ends 26 and an angular or retracted position, such as shown in Figs. 3, 5 and 11. The armature comprises a U-shaped bar 29 of soft iron or other metal having high permeability or low flux resistance, and this bar is pivotally mounted midway of its ends by a stud 28, so that the two arms or legs of the U which are relatively short will be disposed parallel to their axis of oscillation and adjacent the polar ends 26 along which they move when attracted by the electromagnets. Because of its shape, the bar of said armature which conducts the flux has relatively large and broad faces at its ends which move adjacent the polar ends of the electromagnet, so as to provide a low resistance air gap, yet it is relatively light in weight and, therefore, may respond promptly to the retraction spring and to the attraction from the electromagnets.

A pair of brass or non-magnetic metal plates 30 and 31 (Figs. 10 and 11) are attached to opposite sides of the armature bar 29 by studs 32 which space the plate 31 from the armature bar, as shown clearly in Fig. 10. The plates 30 and 31 have depending arms or portions 33 which mount between them a pivot stud 34. A latch or pawl 35 is pivoted upon the stud 34, and a spring 36 connects one arm of the latch to one of the plates, such as 31, to urge the latch in a clockwise direction in Fig. 11. A trip arm 37 (Figs. 5 and 7) is also pivoted upon the stud 34, separately from the latch 35, and is provided with an ear 38, Figs. 7 and 9, which engages with a tail of the latch or pawl 35. The free end of the trip arm 37 terminates in a hooked end 39 extending partially around the axis of the pivot stud 28 of the armature.

An arm 40 is pivoted at 41 in one of the frame plates on which the impulse lever 24 is mounted, and this arm 40 extends across the axis of oscillation of the armature and at approximately said axis mounts a pin 41a which is received loosely in the hooked end 39 of the trip arm 37. The arm 40, at its free end, is provided with a U-shaped lateral extension 42, between the arms of the U of which is rotatably mounted a pin 43 of a Hipp contact pendant 44, so that the pendant may swing back and forth freely in the direction in which the pendulum and crutch oscillates.

The frame plate 9 carries an angularly extending lug 45 (Figs. 3 and 5) having a vertically extending slot which receives and guides the lever 40 and limits its downward movement to a position in which the trip pin 41a is approximately in alignment with the axis of the pivot stud 28 of the armature. The slot, however, permits upward movement of the arm 40 for a purpose which will appear shortly. The hooked end 39 of the trip arm 37 rests upon the trip pin 41a the hooked end being held against the pin 41a by the pressure of the tail of the latch 35 upon the trip arm 37, under the influence of the spring 36. Since the pin 41a is normally at the axis of oscillation of the armature, the latch 35 will remain substantially quiet on its pivot 34 during oscillation of the armature.

The impulse lever 24 is provided with a bracket 46, Figs. 4, 5 and 9, and a somewhat U-shaped strike member 47 is disposed between the impulse member 24 and the bracket 46, and pivotally mounted therebetween by a stud 48 which extends between the bracket 46 and the lower end of the member 24. A spring 49 is connected between a tail of the member 47 and the bracket 46, so as to urge the strike member yieldingly and resiliently in one direction until it strikes the bent-over ear 50, Figs. 7 and 9, provided on the member 24.

The bracket 46 is also provided with a struck out, depending projection 51, Figs. 4 and 9, which restricts excessive rotary movement of the strike member 47 in a direction against the action of the spring 49. The strike member 47 is provided with a strike plate 52 which extends generally in the direction of its path of movement about the pivot 25 of the impulse lever, and the lower edge of this strike plate 52 normally rests upon the nose of the latch or lever 35, as shown in Figs. 3, 5 and 11.

The armature plate 31 (Figs. 2 and 10) is provided with a pair of ears 53 which project through slots 54 in the plate 7 of the clock frame. Springs 55 are connected between the ears 53 and suitable struck up ears 56 of the plate 7 and tend to retract the armature into the position shown in Figs. 3, 5 and 11, in which its ends are out of alignment with the poles 26 of the electromagnets. Since the springs 55 normally hold the armature retracted, the armature through the latch or pawl 35 and the strike member 47 will hold the impulse arm or lever in elevated or poised position in which it is inactive on the pendulum crutch, as shown in Figs. 3 and 5.

The pendulum crutch is provided with a Hipp contact blade or member 57 (Figs. 3, 5 and 7) which cooperates with the pivotally suspended pendant 44. The lower end edge of the pendant 44 is inclined to the horizontal when the pendant is freely suspended, as shown in Fig. 9, and this inclined edge is provided with a row of notches 58 over which the blade 57 of the cooperating member trails as it moves back and forth with the pendulum crutch.

As is usual with Hipp contact mechanisms, the blade 57 oscillating back and forth with the pendulum and crutch will merely cam the pendant 44 from side to side and clear it, so long as the pendulum has its normal amplitude of oscillation. When the amplitude of oscillation of the pendulum falls below a selected minimum for which the Hipp contact mechanism is designed, the blade or member 57 will not quite clear the pendant 44, and then when the pendulum starts its return oscillation, the member 57 will be engaged with one of the notches and will cam the pendant 44 upwardly, as shown in Fig. 7, which elevates the arm 40 and its trip pin 41a.

The pin 41a by its engagement with the hooked end 39 of the trip arm 37, will rock the trip arm 37 and through it the latch or pawl 35 into the position shown in Fig. 7 and release the strike member 52. Thereupon the impulse lever 24 is free to fall and in falling, its impulse roller 23 will cam the crutch and pendulum toward the mid-point of their arc of oscillation. This impulse to the pendulum causes it to increase its amplitude of swing and thus maintains it in oscillation.

A pair of contact leaf springs 59 (Figs. 5 and 9) are arranged side by side and anchored at one end to an angle bracket 59a provided on a face of the impulse lever or arm 24. The springs 59 extend upwardly and are urged by their own resiliency against a bent-over arm 60 on the impulse lever 24. The extreme free ends of the springs 59 carry contact buttons 61 which are adapted to engage with the ends of contact studs 62 after the impulse lever 24 has delivered its impulse to the pendulum. The springs 59 may be considered as resilient buffers and the studs 62 function as stops for the buffers to limit the driving movement of the member 24. The studs 62 extend between spaced sections 63 of a bracket member 64 which is secured to and insulated from the frame plate 7 in any suitable manner.

The studs 62 pass through aligned apertures in the sections 63, and are threaded in the apertures of one of the sections and slide and rotate in the apertures of the other section 63. Thus by turning the studs, they will be threaded outwardly to various extents to determine, selectively, the limit of movement of the impulse lever while delivering its impulse to the pendulum. A helical spring 62a surrounds each stud between the sections 63, and is under compression between a section 63 and a shoulder of the stud, so as to hold the stud frictionally against rotation. The bracket 64, which is insulated from the frame plate 7, serves as a circuit contact member.

An electric circuit shown diagrammatically in Fig. 12 is closed by the engagement of the springs 59 with the studs 62, and includes the electromagnets 6. When the electromagnets are energized, they will attract the armature 27 into a straight position between the poles 26, during which the retracting springs 55 will be tensioned. The latch or pawl 35 will be carried with the armature during such movement, and when the armature has approximately reached a straight line position between the poles of the electromagnet, the nose of the latch 35 will re-engage with or snap beneath the plate 52 of the member 47.

At approximately the time of such engagement or just shortly prior thereto, the armature in closely approaching the straight line position with the electromagnets, will engage with a buffer spring 66, Fig. 8, which causes the armature to rebound slightly, and during this rebound the armature will carry with it the impulse lever 24, to which it has just been relatched, far enough to separate the contact springs 59 from the studs 62, thus opening the circuit of the electromagnets. Thereupon the retraction springs 55 will return the armature to the normal angular or retracted position, shown in Fig. 5, and at the same time the impulse lever 24 will be elevated and held in poised position, as also shown in Fig. 5, ready for a new impulse movement.

The buffer spring 66 (Figs. 8 and 10) may be a leaf spring extending along the face of the frame plate 7 opposite from the armature. The plate 7 may have a pair of ears 67 struck out therefrom on the side of the plate opposite the armature, and each ear 67 may have a prong 68 upon its upper edge, which is received in a suitable aperture in the leaf spring 66. A third lug or ear 69 is also struck out from the plate 7 and bent over against the upper or opposite face of the leaf spring 66, to confine it against the ears 67. The leaf spring 66 is thus rigidly mounted intermediate of its ends, and its two ends are free to flex. The free ends are normally urged resiliently against ears 70 which are also struck out from the plate 7 across the free ends of the springs 67.

The ears 70 are so placed that the free ends of the springs 66 will always be under considerable stress of flexure, and consequently the spring ends will offer material initial resistance to the armature when the latter engages it. Inasmuch as the armature is on the opposite side of the plate 7, the plate 31 thereof is provided with arms 71 which extend through apertures 72 in the plate 7, and terminate in lateral ends 73 which engage with the free ends of the leaf spring 66 alternately as the armature approaches attracted and retracted positions. It will be observed that by bending the angular ends 73 toward or from the leaf spring 66, the amplitude of oscillation of the armature may be varied, and thus the instant of engagement of the armature with the buffer spring 66 may be accurately determined and regulated with respect to the relatching of the latch or pawl 35 with the impulse member, and also the exact retracted position of the armature which determines the exact elevated or poised position of the impulse lever may be varied. The buffer spring cushions the armature at its extremes of movement and, therefore, makes the operation remarkedly quiet.

The contact studs 62 are so positioned that they stop the operation of the impulse lever at about the time the pendulum and its crutch reach their mid-point of oscillation. Therefore, if the pendulum is stationary, and the impulse lever is released, it will fall and strike the pendulum crutch with a force sufficient to give the pendulum a small amplitude of oscillation. Immediately thereafter the armature will be attracted following the closing of the circuit to the electromagnets, and the impulse lever will be promptly restored to poised position.

There are sufficient teeth and notches 58 on the pendant 44, so that the latter will be engaged and operated by the Hipp contact member 57 for any material amplitude of oscillation of the pendulum below a selected desired minimum. It follows, therefore, that as soon as the pendulum is started in oscillation by the falling impulse lever, the Hipp contact mechanism will cause release of the impulse lever at each oscillation or beat of the pendulum, until the amplitude of oscillation of the pendulum is built up and exceeds the desired minimum, after which the Hipp contact mechanism will only release the impulse lever when the pendulum slows down below the selected minimum amplitude of oscillation.

By reason of the inclined, notched lower edge of the pendant 44, the Hipp contact mechanism will only release the impulse lever when the pendulum is moving in the right direction to receive the impulse advantageously, and by reason of the relatively long lower edge of the pendant, the Hipp contact mechanism may be made effective to release the impulse lever for any amplitude of oscillation of the pendulum from almost nothing up to the desired minimum amplitude above which it is desired to keep the pendulum. This makes the clock practically non-stopping, except for possible exhaustion of the batteries, and almost self-starting.

The pendulum drives the clock train 74 in the usual or any suitable manner, and in the illustrated embodiment of this clock, a pair of escapement pawls 75 and 76 (Fig. 6) are pivoted on the crutch pivot 21 separate from one another and are connected by a spring 77 which tends to move the driving ends 78 toward one another. The pawls also have arms 79 which extend on opposite sides of the crutch 20 which limits the operation of the pawls 75 under the action of the spring 77 in a manner to maintain normally a fixed distance between the driving ends 78. The driving ends cooperate with escapement pins 80 provided on a ratchet wheel 81, the latter being fixed on a rotatable shaft 82.

During normal operation of the pendulum, the driving pawls 75 and 76 oscillate with the crutch as a unit because they are held against the crutch by the spring 77. During such oscillation of the pawls 75 and 76, the driving ends 78 will alternately enter the spaces between the pins 80, and the driving ends are beveled and in a half step relation to one another, so that as the pawls oscillate back and forth, the driving ends will propel the wheel 81 step by step, the movement of the pawls between the teeth preventing overrunning of the wheel 81. Reverse movement of wheel 81 is prevented by a gravity operated pawl 83 which rides upon ratchet teeth 84 on the periphery of the wheel 81.

The shaft 82 carries a pinion 85, Fig. 2, which drives the clock train 74, and the clock train in turn drives the hour hand 86, the minute hand 87 and the second hand 88. It will be observed that the single leaf spring 66 serves to cushion and limit the movement of the armature in both directions and is mounted on the frame plate in a simple manner without the use of rivets or screws, and is firmly secured against displacement. The mounting of the spring 66 is a relatively simple operation.

The operation of such a clock should be obvious from the foregoing description of the details thereof, but will be briefly summarized. Assuming that the pendulum is oscillating through its normal amplitude, the blade 57 of the Hipp contact mechanism will cam the pendant 44 from side to side and clear it at each oscillation of the pendulum. The pendulum in oscillating drives the clock train or any other mechanism which may be substituted for the clock hands. The impulse lever 24 is held in its elevated position by the retracted armature.

When the amplitude of oscillation of the pendulum decreases below a desired minimum, which is at least sufficient to cause complete step by step movement of the wheel 81, the Hipp contact blade 57 will fail to clear the notches 58 in the lower edge of the pendant while the pendulum is swinging away from its mid-position of oscillation. As soon as the pendulum starts its reverse travel, the blade will engage in one of the notches 58 and force the pendant and arm upwardly as the pendulum continues to swing toward the mid-position. This lifting of the arm 40 disengages the latch 35 from the impulse lever, which falls and imparts a driving impulse to the pendulum crutch to increase the amplitude of oscillation of the pendulum.

At the completion of the impulse delivery, the electric circuit is closed, the armature retracted and relatched to the impulse lever, the circuit broken and the armature returned to retracted position, during which it elevates the impulse lever into poised position ready for delivery of a new impulse to the pendulum. These impulses will continue at each oscillation of the pendulum, unless the pendulum practically stops, until the amplitude of oscillation of the pendulum has been increased above the desired minimum. After that, the impulses will be delivered only as necessary to maintain the pendulum in oscillation through a desired amplitude.

From the foregoing description, it will be observed that if the resistance to the movement of the clock train or the load thereon should increase, the pendulum will tend to slow down more rapidly and the Hipp contact mechanism will cause more frequent releases of the impulse lever, and thus provide for the extra energy required to overcome the increased resistance. When the resistance is a minimum, the number of releases of the impulse lever will be a minimum, and since the current consumed will be dependent upon the number of impulses delivered, the energy required to drive the clock train will vary with the load thereon. With this arrangement, the pendulum will be kept in oscillation and through the desired range of amplitude of oscillation, so that any varying load on the clock train will not vary the accuracy of the clock in any way, the only effect of a varying load being a variation in the amount of energy required to keep the pendulum in oscillation.

It will be obvious that various changes in the details, which have been herein described and illustrated in order to explain the nature of the invention, may be made by those skilled in the art within the principle and scope of the invention as expressed in the appended claims.

1. In a clock, a frame having a plate, clock mechanism supported by said frame and including an oscillating armature, a leaf spring supported intermediate of its ends by said plate, with its free ends engageable by opposite ends of said armature to limit resiliently the arc of oscillation of said armature.

2. In a clock, a frame having a plate, said plate having a pair of ears struck out therefrom in the same direction from one face of the plate, said ears having prongs upon corresponding side edges thereof, a leaf spring resting upon and extending away from said edges and having apertures receiving said prongs, and a third ear struck out from said plate and bearing against the face of said leaf spring opposite from said first ears to confine said spring upon said prongs, whereby said leaf spring will be anchored to said plate.

3. In a clock, a frame having a plate, said plate having a pair of ears struck out therefrom in the same direction from one face of the plate, said ears having prongs upon corresponding side edges thereof, a leaf spring resting upon and extending away from said edges and having apertures receiving said prongs, a third ear struck out from said plate and bearing against the face of said leaf spring opposite from said first ears to confine said spring upon said prongs, whereby said leaf spring will be anchored to said plate, and clock mechanism mounted in said frame and including an oscillating member engageable, at one limit of its movement with the projection portion of said leaf spring.

4. In a clock, a frame having a plate, said plate having a pair of ears struck out therefrom in the same direction from one face of the plate, said ears having prongs upon corresponding side edges thereof, a leaf spring resting upon and extending away from said edges and having apertures receiving said prongs, a third ear struck out from said plate and bearing against the face of said leaf spring opposite from said first ears to confine said spring upon said prongs, whereby said leaf spring will be anchored to said plate, and a fourth ear struck out from said plate and spaced between the free end of said leaf spring and said first mentioned ears and against which the leaf spring abuts, said last recited ear being so disposed as to produce flexure in said spring, whereby said spring will be yieldingly and resiliently urged against said fourth ear with considerable pressure to provide a relatively stiff but yielding buffer at its free end.

5. In a clock, clock mechanism including an oscillating armature, said armature having an extending arm of ductile metal terminating in an angular end, a resilient buffer in the path of oscillation of said angular end for limiting the oscillation of said armature in one direction, whereby by bending said angular end toward and from the buffer, the position of the armature when stopped by said buffer may be selectively varied.

6. In a clock, clock mechanism having an oscillating member, a leaf spring supported intermediate of its ends and having its free ends disposed in the path of movement of and engageable alternately by said member, to limit resiliently the arc of oscillation of said member in both directions.

7. In a clock, clock mechanism including a pivoted oscillating armature, electromagnetic means having poles between which the armature is disposed, said armature having a U-shaped bar of flux conducting material with the pivot of the armature centrally of the bottom of the U and with the arms of the U extending into proximity to said poles, whereby said armature will have relatively broad end faces for the air gap and a minimum weight.

8. In a clock, an oscillating element, an impulse member mounted for movement in a prescribed path in which it may deliver an impulse to said element to maintain the latter in oscillation, said member having an abutment, a leaf spring fixed at one end on said member and resiliently bearing against said abutment in the direction in which said member moves during delivery of said impulse, a stop fixed in the path of travel of the free end of said spring with said impulse member for limiting the travel of said member in an impulse delivering direction, means rendered effective by engagement of said spring with said stop for resetting said member for a further impulse to said element, and means for controlling said member from said element.

9. In a clock, an oscillating element, an impulse member yieldingly urged in a direction to impart a driving impulse to said element, a resilient buffer carried by said member and a stop for said buffer to limit movement of said member and having parallel spaced sections, said sections having alined apertures, a stud threaded into one of said apertures and rotatably and slidably mounted in the other of said apertures and extending towards said buffer, whereby said stud may be adjusted through said sections in one direction or the other by threading it through the threaded aperture, and a coil spring on said stud between said sections and bearing at one end against one of said sections and at the other end upon a shoulder of said stud to hold said stud frictionally against rotation, whereby said stud may be threaded through said sections to limit variably the travel of said impulse member, and will be held frictionally against movement out of different adjusted positions in which it may be placed.

10. In a clock, a U-shaped bar of iron having high magnetic permeability pivoted midway of the cross part of the U, an electromagnet having pole pieces disposed adjacent opposite ends of said pivoted bar, with the arm of the U extending parallel to the axis of its oscillation and also parallel to the polar faces of the electromagnet, a pair of plates disposed on opposite faces of the cross bar of the U and spaced apart along the axis of oscillation of the bar, studs passing through said bar and said plates to form a rigid armature frame, latch mechanism pivoted between said plates, an oscillating element having a natural period of oscillation, an impulse device operable upon said element to maintain it in oscillation and normally held inoperative by said latch device, means controlled by said element for operating said latch device to release said impulse device, a circuit including said electromagnet rendered effective when the impulse device has delivered its impulse for attracting said armature into a position to relatch it to said impulse means, a resilient buffer engaged by said armature just slightly before the armature relatches to said device, whereby the rebound of said armature after relatching will move said impulse device sufficiently to open said circuit, and means for retracting said armature when released by said electromagnet which restores said impulse device to initial position.

11. In a clock, a U-shaped bar of iron having high magnetic permeability pivoted midway of the cross part of the U, an electromagnet having pole pieces disposed adjacent opposite ends of said pivoted bar, with the arms of the U extending parallel to the axis of its oscillation and also parallel to the polar faces of the electromagnet, a pair of plates disposed on opposite faces of the cross bar of the U and spaced apart along the axis of oscillation of the bar, studs passing through said bar and said plates to form a rigid armature frame, latch mechanism pivoted between said plates, an oscillating element having a natural period of oscillation, an impulse device operable upon said element to maintain it in oscillation and normally held inoperative by said latch device, means controlled by said element for operating said latch device to release said impulse device, a circuit including said electromagnet rendered effective when the impulse device has delivered its impulse for attracting said armature into a position to relatch it to said impulse means, a resilient buffer engaged by said armature just slightly before the armature relatches to said device whereby the rebound of said armature after relatching will move said impulse device sufficiently to open said circuit, means for retracting said armature when released by said electromagnet which restores said impulse device to initial position, one of said plates having an arm extending therefrom and engageable with said buffer and bendable to vary the position of the armature at which it engages the buffer.

12. In a clock, an oscillating element, an impulse member operable thereon to maintain it in oscillation, a resiliently mounted strike member operable with said member, a latch member normally engaged with said strike member and holding said impulse member in poised inactive position, means for operating said latch member to release said impulse member when an impulse on said element when released, and means rendered effective by said impulse member, after the delivery of an impulse to said element, for moving said latch member into relatched engagement with said strike member, and then by engagement with said strike member returning said impulse member to initial inactive position.

13. In a clock, an oscillating element, an impulse member operable thereon to maintain it in oscillation, a strike member mounted on said impulse member and resiliently urged thereon in the direction of movement of said impulse member in impulse delivering direction, said impulse member having a stop limiting the movement of said strike member in the direction in which it is urged, a latch member normally engaged with said strike member and holding said impulse member in poised inactive position, means for operating said latch member to release said impulse member when an impulse on said element is desired, means for limiting the travel of said impulse member when released, and means rendered effective by said impulse member, after the delivery of an impulse to said element, for moving said latch member into relatched engagement with said strike member, and then by engagement with said strike member returning said impulse member to initial inactive position.

14. In a clock, a frame, an oscillating element having a natural period of oscillation, an arm pivotally mounted by said frame and extending in a direction parallel to the plane of oscillation of said element, a Hipp contact element carried by said arm, said frame having a sheet metal projection extending across the path of movement of said arm and provided with a slot in which said arm may move when oscillated about its own pivot, a cooperating Hipp contact element carried by said oscillating element, and means controlled by said arm and rendered effective through operation of said arm by said Hipp contact elements for delivering impulses to said element to maintain it in oscillation.

15. In a clock, a plate having a plurality of apertures, an oscillating armature mounted at one side of said plate, said armature having arms of ductile metal extending through said apertures and terminating in angular ends, a leaf spring mounted between its ends on said plate at the face opposite said armature, with its free ends in the path of movement of said angular ends, said plate having ears bent therefrom and forming stops against which the free ends of said leaf spring are urged by the resiliency of said spring, whereby the armature will be limited in its arc of oscillation by the engagement of said angular ends with the free ends of said leaf spring, and the limits may be varied by bending of said angular ends, and clock mechanism of which said armature is a part.

16. In a clock, an impulse member, a resiliently mounted strike member carried by said member, a latch device normally engaged with said strike member and through it holding said impulse member in poised inactive position, means operable on said device to release said impulse member when its activity is desired, and means rendered effective by said impulse member, when the latter is active, for returning said impulse member to said poised position for reengagement of said strike member with said latch device.

17. In a clock, an improved Hipp contact mechanism therefor, which comprises a pendant member and a relatively rigid blade member which cams the pendant from side to side and causes a trailing engagement between them upon relative oscillation of the members, and means for oscillating one of said members, said pendant member having a row of transversely extending notches along the edge having the trailing engagement with said blade member, said notched edge being inclined to the horizontal when said pendant member is free of the blade member, the high end of said edge being the end first engaged with said blade member during relative oscillation of said members when the oscillating member starts from approximately mid-position.

18. In a clock, an impulse member mounted for movement in a prescribed path and having an abutment, a strike member mounted on said member and movable against said abutment in the direction in which it moves with said impulse member during the delivery of the impulse, means yieldingly urging said strike member against said abutment, a latch device normally engaging said strike member and through it holding said impulse member in poised, inactive position, means operable on said latch device to release said impulse member when its activity is desired, and means rendered active by said impulse member as it moves following its release for returning said impulse member to said poised position for reengagement of the strike member with said latch device.

19. In a clock, an oscillating time measuring element, an impulse member operable on said element to increase the amplitude of oscillation of the latter, a latch normally holding said impulse member in poised, inactive position, a pivoted arm, a pendant pivoted to the free end of said arm, depending freely therefrom, and having an end edge provided with transversely extending notches arranged in a row along the length of said edge, a blade oscillating with said element and trailing over said notched edge as it cams said pendant from side to side, means by which the failure of the blade to clear the pendant during movement of one direction will cause a movement of said pivoted arm during the initial part of the following reverse oscillation of said element, means by which movement of said pivoted arm operates said latch to release said impulse member, said notched edge being approximately normal to a radius from that edge to the axis of oscillation of said element when said blade is trailing idly over said edge in its movement away from its mid-way position, whereby the lift on said pendant tending to operate said latch will be uniform regardless of which notch is engaged by said blade.

ARTHUR F. POOLE.